J. H. Quackenbush,
Washing Machine,
Nº 69,246. Patented Sep. 24, 1867.

Witnesses:
Theo Tusche
W. D. Overell

Inventor:
J. H. Quackenbush
Per Munn & Co
Attorneys.

United States Patent Office.

J. H. QUACKENBUSH, OF EAST SAGINAW, MICHIGAN.

Letters Patent No. 69,246, dated September 24, 1867.

IMPROVED WASHING MACHINE.

*The Schedule referred to in these Letters Patent and making part of the same.*

TO ALL WHOM IT MAY CONCERN:

Be it known that I, J. H. QUACKENBUSH, of East Saginaw, in the county of Saginaw, and State of Michigan, have invented a new and useful improvement in Washing Machine; and I do hereby declare that the following is a full, clear, and exact description thereof, which will enable those skilled in the art to make and use the same, reference being had to the accompanying drawings, forming part of this specification.

The object of this invention is to provide a simple and effective machine for cleansing linen and other articles of domestic use, and it consists in subjecting the article to be washed to both a squeezing and a rubbing process at the same time, by means of corrugated rollers, as I will proceed to describe.

Similar letters of reference indicate corresponding parts.

Figure 1:
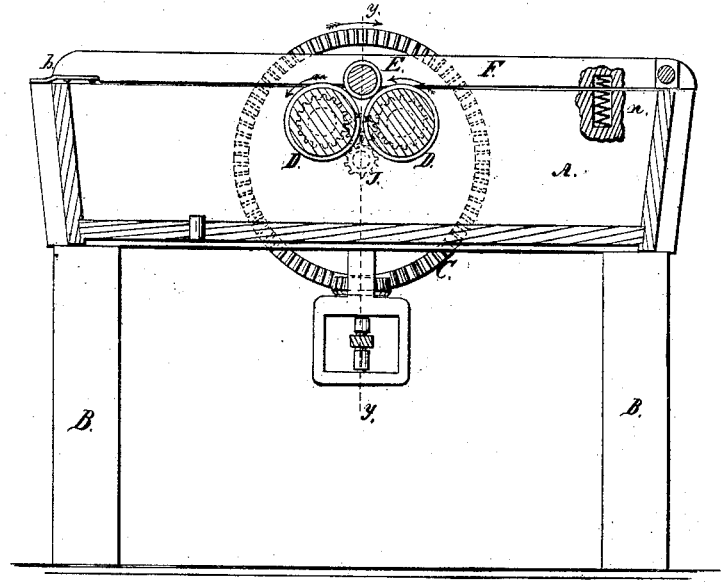
Figure 1 represents a vertical sectional elevation of the machine, showing the form of the box and frame and the rollers in cross-section, also the driving-wheel and pinions, the section being through the line $x$ $x$ of fig. 2.
Figure 2:
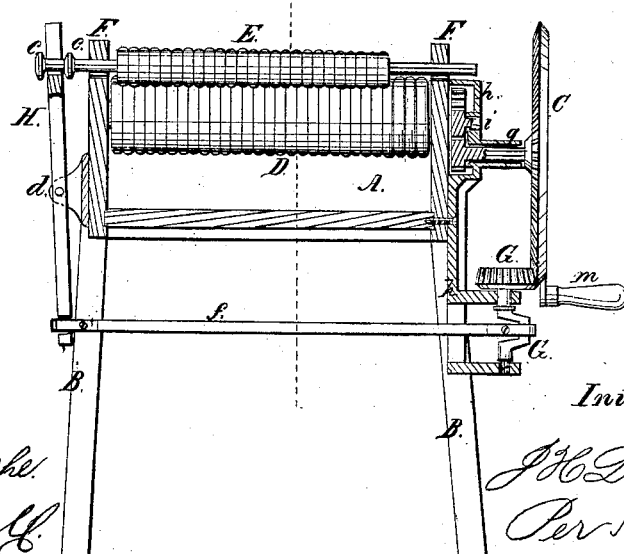
Figure 2 is a vertical cross-section of the machine through the line $y$ $y$ of fig. 1.

A represents the box of the machine in which the washing is done. B represents the legs. C is the driving-wheel, which has a handle attached to it, by which the wheel is revolved. D D are the two revolving corrugated rollers, which are driven, by pinions on their ends, by the shaft of the main wheel C. E is a small corrugated roller, which is attached, by journals at its ends, to a frame, F, which frame is hinged to the top of the box A at one end, as seen at $b$, and which corresponds in size with the top of the box, as seen in the drawing. This roller E has long journals, which allow it to have a longitudinal motion over the rollers D D, and on the clothes in the process of washing. This longitudinal and rubbing motion is given by a crank-shaft marked G, which has a wheel, G', on its upper end, which engages with the driving-wheel C. H is a vibrating lever, which is attached to the frame or box by a pivoted connection, as seen at $d$, on which pivot or pin it is vibrated by the connecting-rod $f$. The upper end of this lever is secured to the shaft or journal of the roller E by collars $e$ $e$. The rod $f$ is attached to the lever by a loose connection at one end, and to the crank G at the other, as seen in the drawing. The shaft of the main wheel is connected to the box by a sleeve, $g$, and metallic frame or bracket $h$, which frame $h$ supports the main wheel and the crank-shaft G below. On the shaft of the main wheel there is a driving-pinion, J, as seen in fig. 1, and between the two rollers D D there is a loose pinion, $i$, which turns on a pivot or stud in the frame $h$. This pinion is driven by the pinion J on the main-wheel shaft, and it meshes into the gear-wheels on the ends of the rollers D D.

The clothes are passed into the machine between the roller E and the two rollers D D. And it will be seen that by turning the driving-wheel by the handle $m$, the rollers D D will be revolved in the direction of the arrows, and the roller E will be given a rapid reciprocating or longitudinal and rubbing motion on the clothes. It will also be given a rotating motion by the movement of the clothes, as they pass through or are carried over the rollers D D. The roller E may be made to bear upon the clothes with more or less force by pressing upon the end of the frame F. $n$ represents springs (one on each side of the box) under the frame F, as seen in fig. 1.

This roller, as well as the rollers D D, may be made of any suitable material, as wood or rubber, or wood covered with rubber or with any other material, or in any other manner which may be found most suitable.

Having thus described my invention, I claim as new, and desire to secure by Letters Patent—

1. The roller E, having a longitudinal motion, substantially as described, in combination with rollers or other moving portion of a washing machine, for the purposes set forth.

2. The rollers D D, operated substantially as described, in combination with the roller E.

J. H. QUACKENBUSH.

Witnesses:
   IRVING M. SMITH,
   MARCUS M. NORTON.